J. P. BIRD.
BOX MAKING MACHINE.
APPLICATION FILED AUG. 12, 1908.

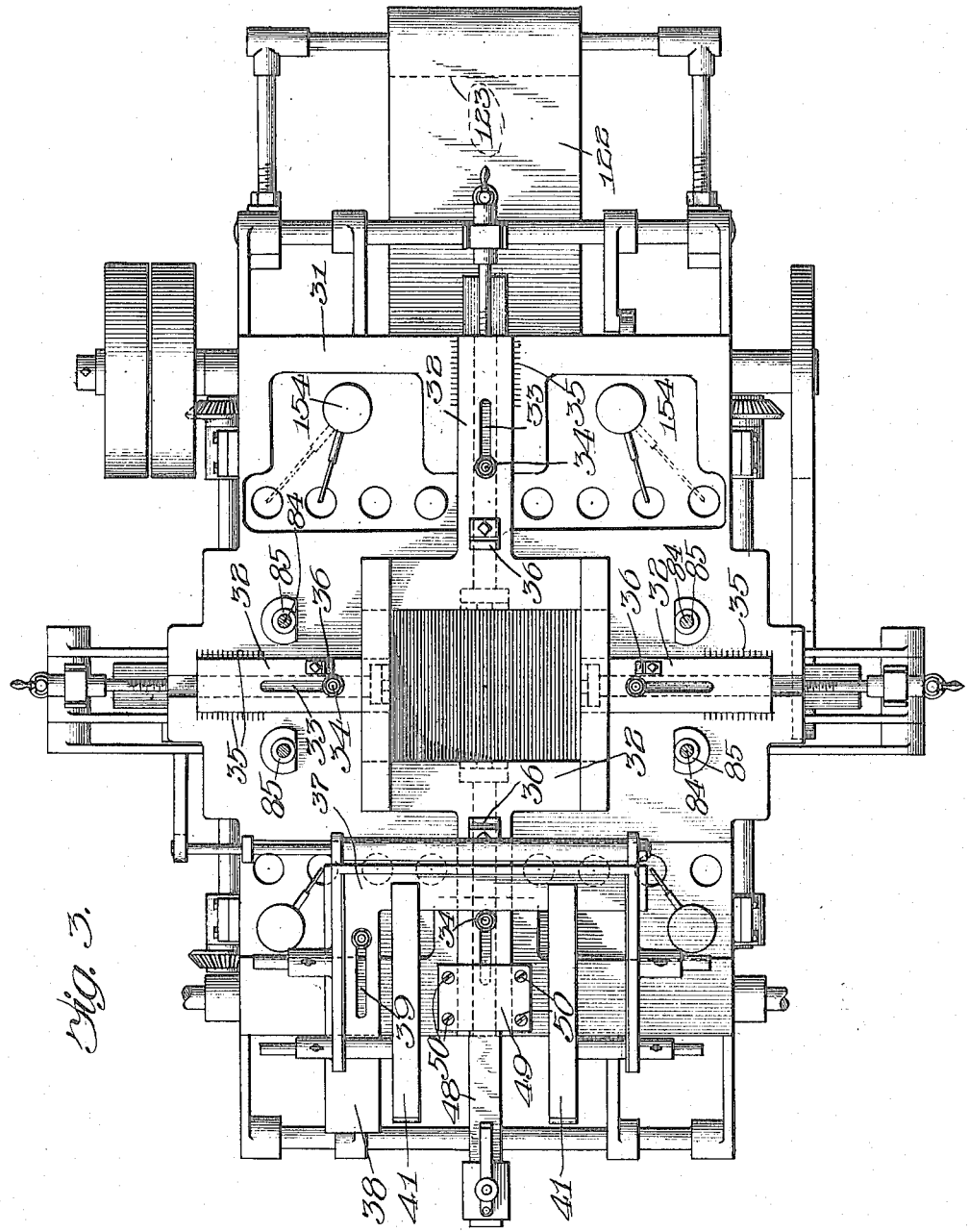

1,131,199.

Patented Mar. 9, 1915.
10 SHEETS—SHEET 4.

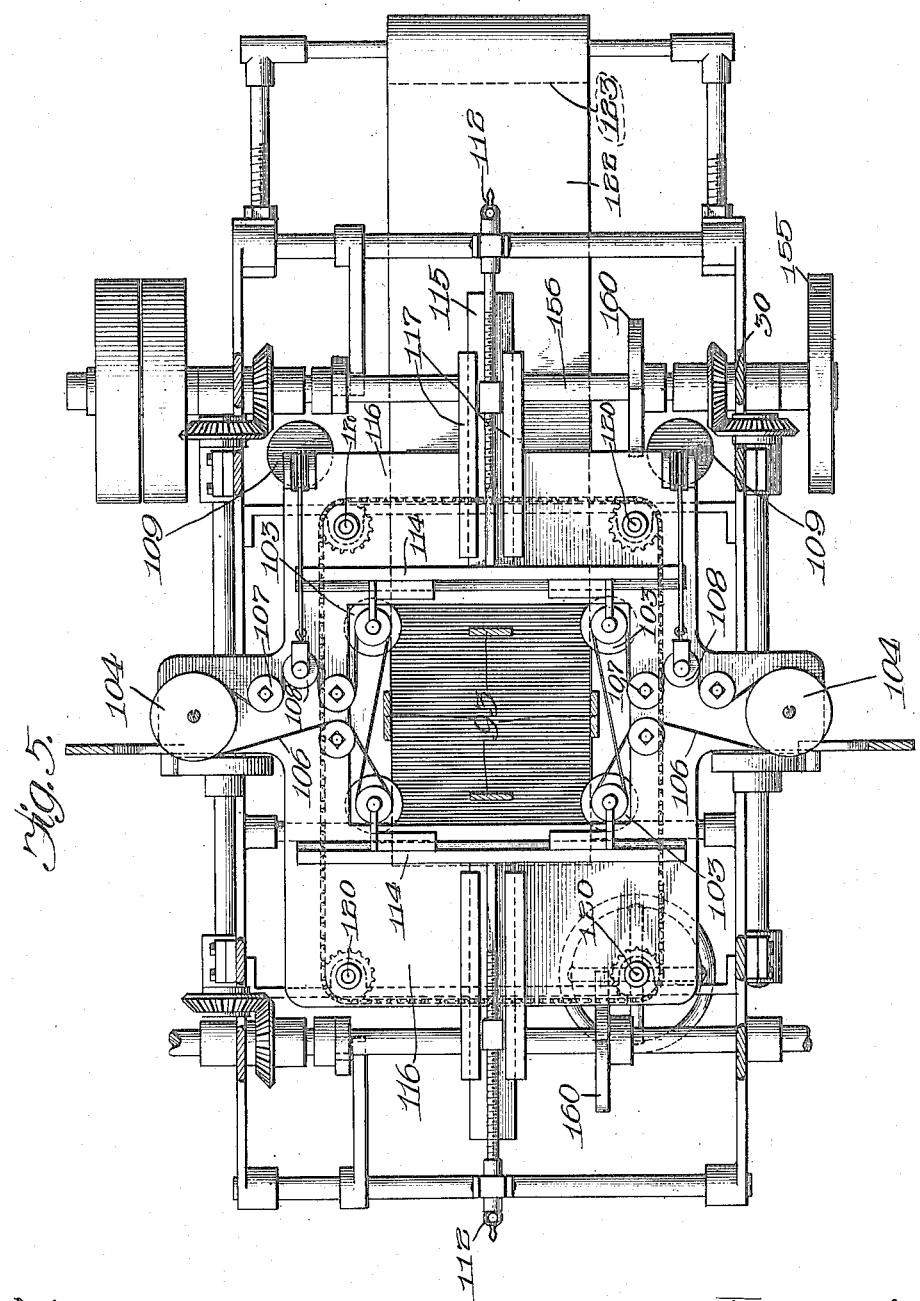

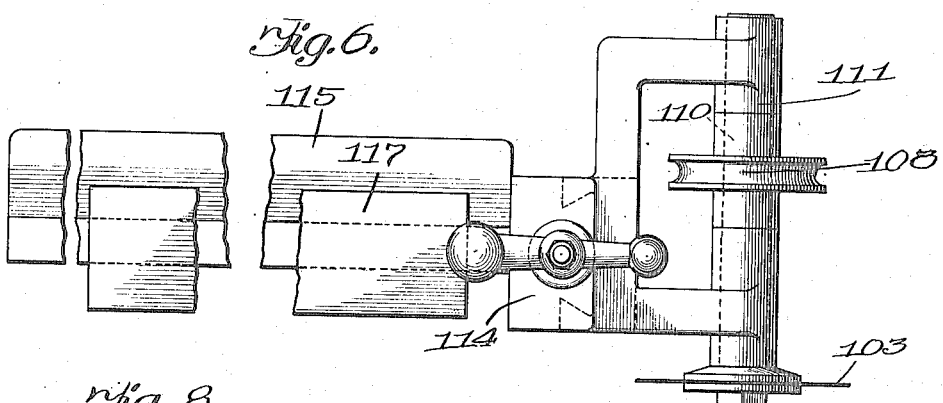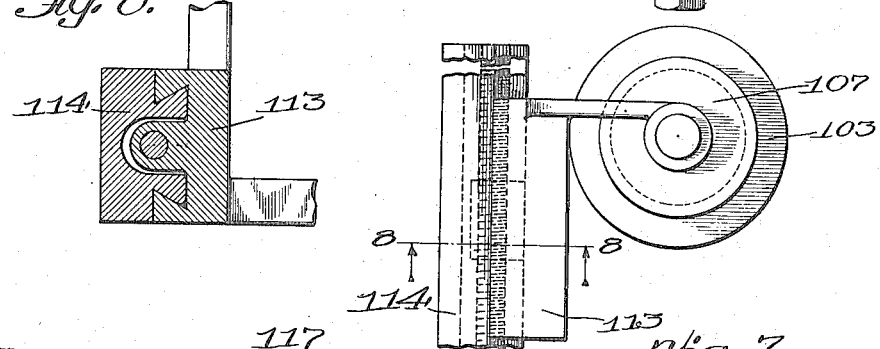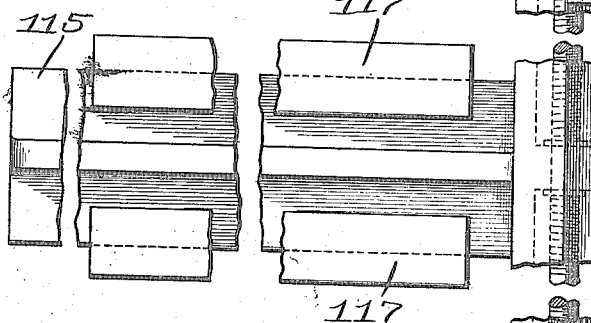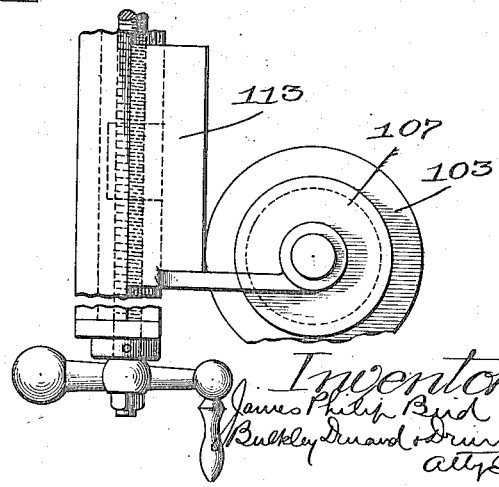

J. P. BIRD.
BOX MAKING MACHINE.
APPLICATION FILED AUG. 12, 1908.
1,131,199.
Patented Mar. 9, 1915.
10 SHEETS—SHEET 7.
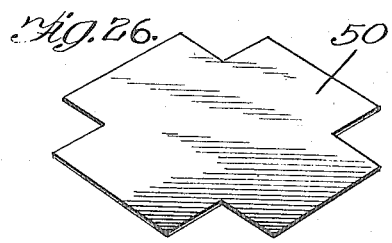
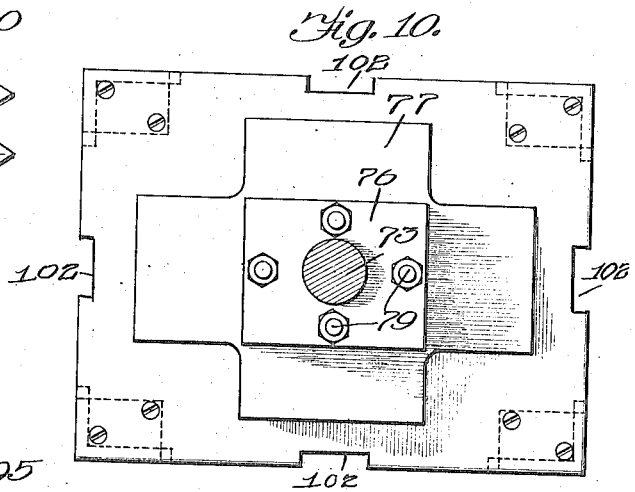
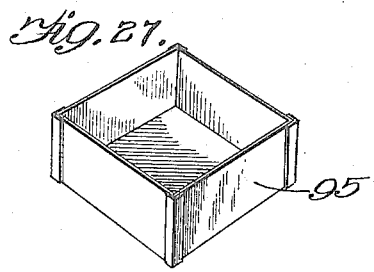
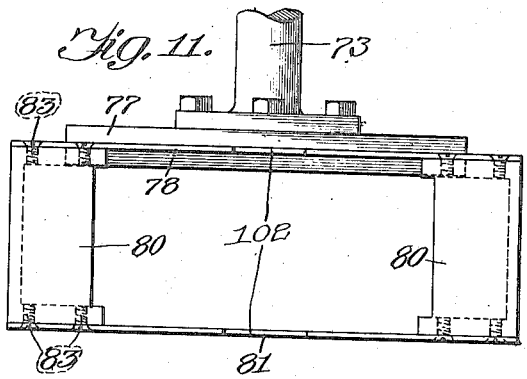
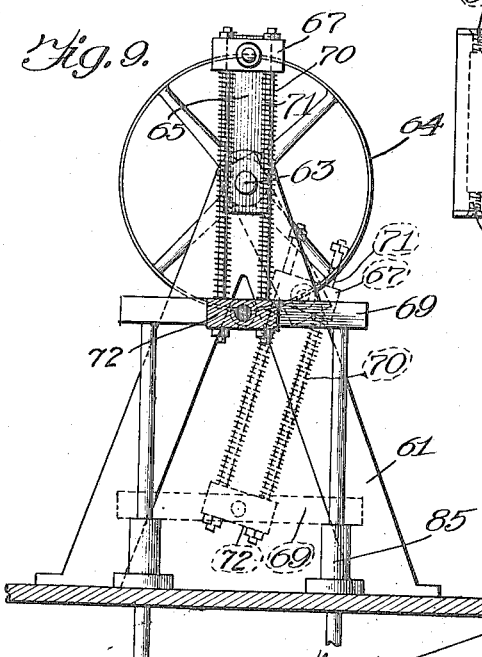
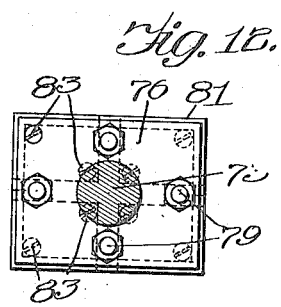
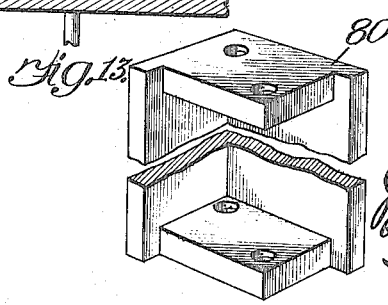

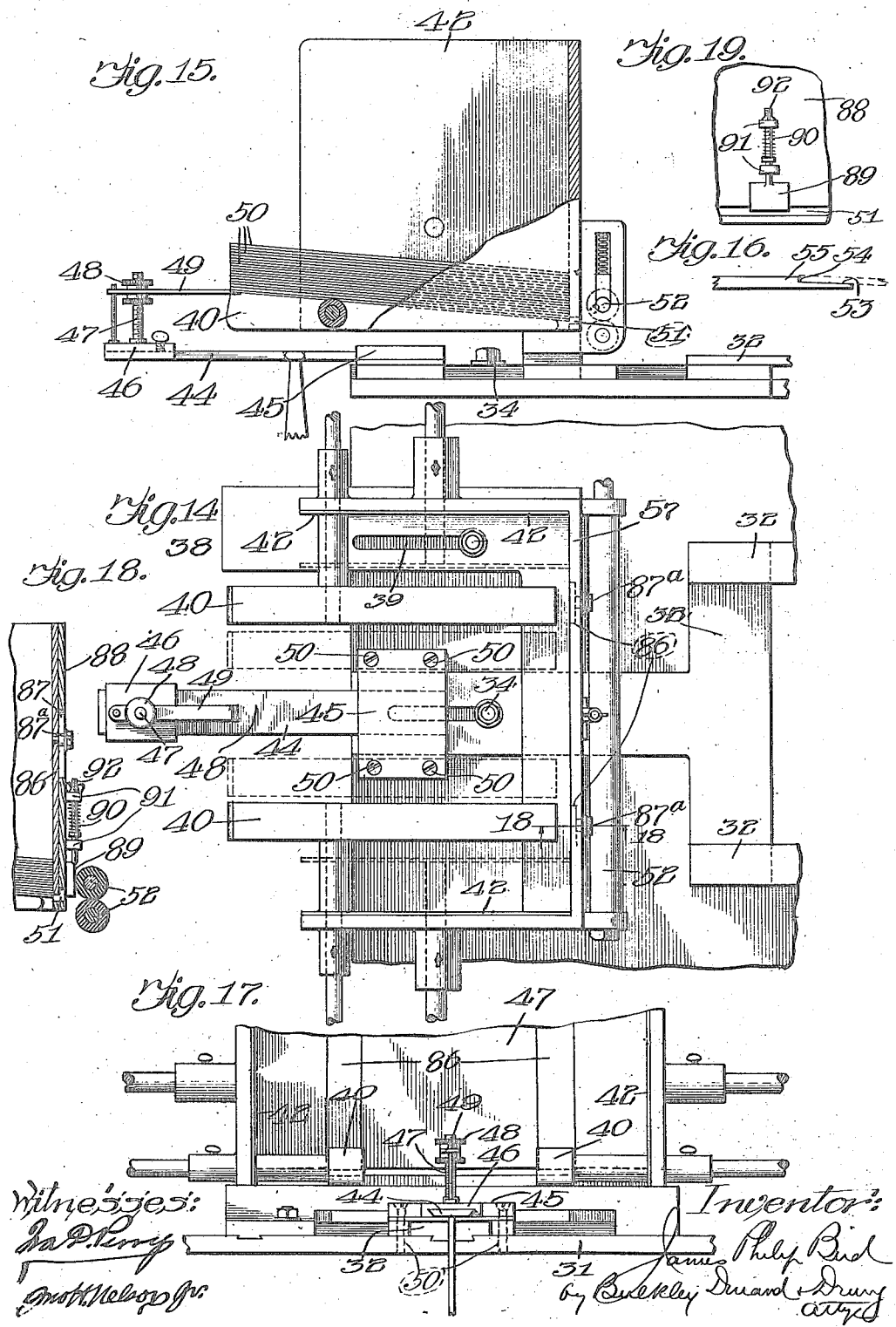

J. P. BIRD.
BOX MAKING MACHINE.
APPLICATION FILED AUG. 12, 1908.
1,131,199.
Patented Mar. 9, 1915.
10 SHEETS—SHEET 9.
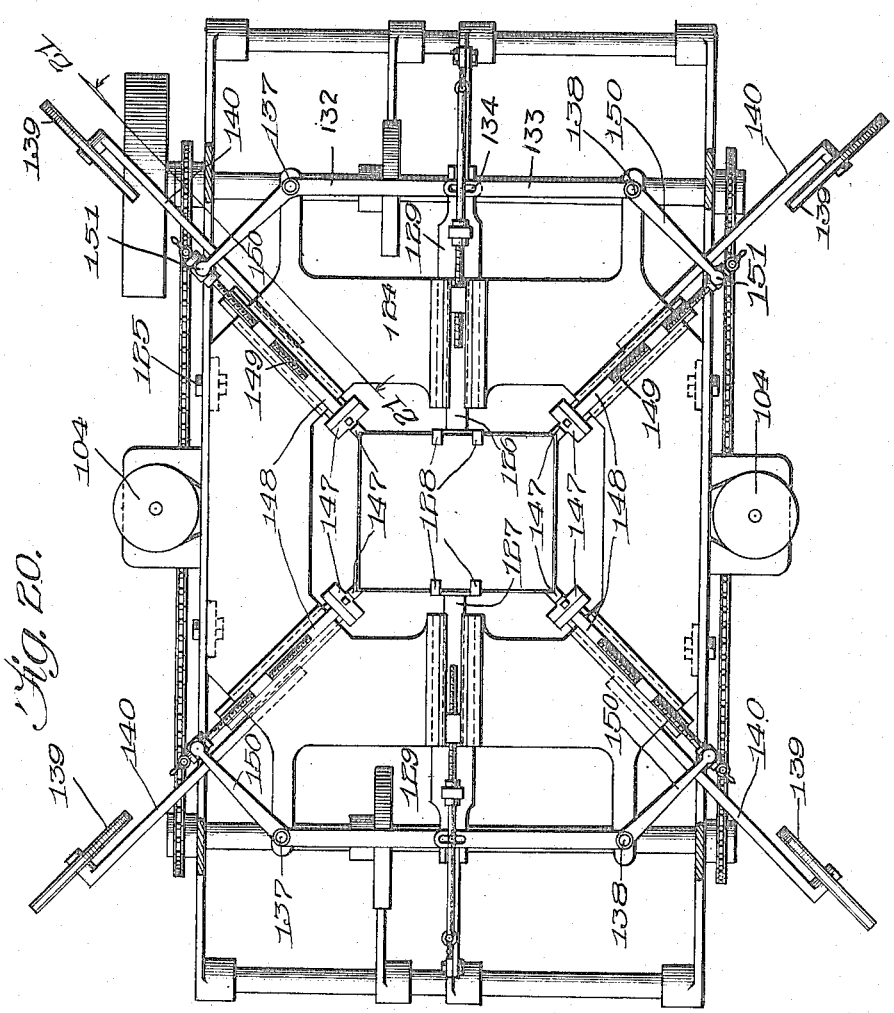

J. P. BIRD.
BOX MAKING MACHINE.
APPLICATION FILED AUG. 12, 1908.
1,131,199.
Patented Mar. 9, 1915.
10 SHEETS—SHEET 10.
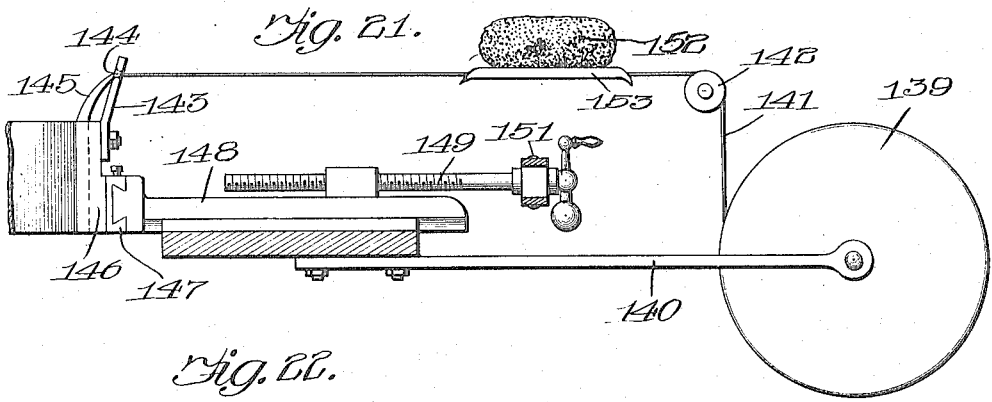
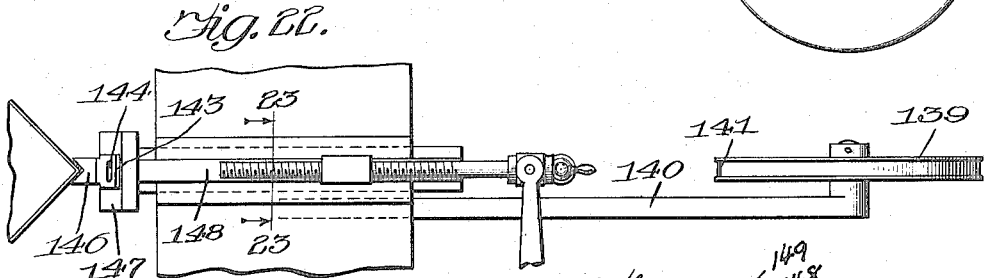
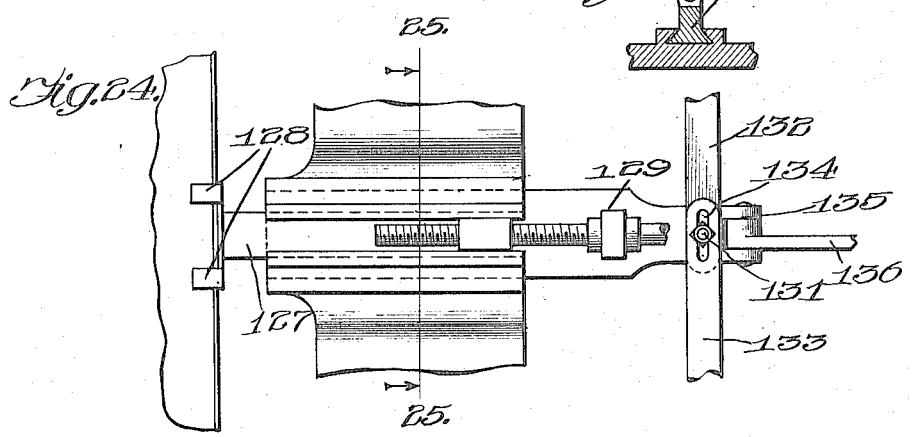
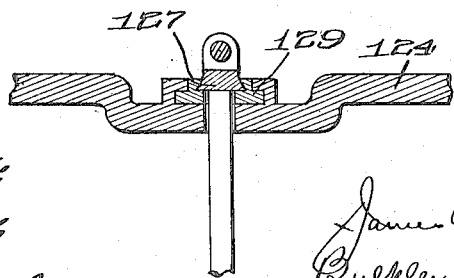

UNITED STATES PATENT OFFICE.

JAMES PHILIP BIRD, OF NEW YORK, N. Y.

BOX-MAKING MACHINE.

1,131,199.   Specification of Letters Patent.   Patented Mar. 9, 1915.

Application filed August 12, 1908. Serial No. 448,160.

*To all whom it may concern:*

Be it known that I, JAMES PHILIP BIRD, a citizen of the United States of America, and resident of New York, N. Y., have invented a certain new and useful Improvement in Box-Making Machines, of which the following is a specification.

My invention relates to improvements in box-making machines, and has for its object the production of a machine in which each box does the feeding of the adhesive or securing tape for the succeeding box, and is in turn forced along by said box.

A further object is the production of a machine in which the tape is applied and a sufficient interval of time allowed to elapse to permit it to dry before being severed from the box.

A further object is the production of a machine in which the cutting mechanism does not require to be adjusted vertically, but the boxes themselves are accurately fed in position to be operated upon without waste of material.

A further object is the production of a machine in which the operating table may be readily adjusted to adapt the machine for any desired size of box, and in which the size of the former and the length of the stroke of the plunger may be readily adjusted to suit the requirements incident to the manufacture of boxes of various sizes and depths.

A further object is the production of a machine in which the blank feeding mechanism may be adapted to operate on blanks of any thickness and at the same time insure delivery of but one blank at a time to the operating table.

A further object is the production of a machine that will efficiently perform its functions, using the fewest number of parts, and of the simplest construction as well as one that is least liable to disarrangement of parts.

These and such other objects as may hereinafter appear, are attained by my machine, embodiments of which are illustrated in the accompanying drawings, in which—

Figure 1:
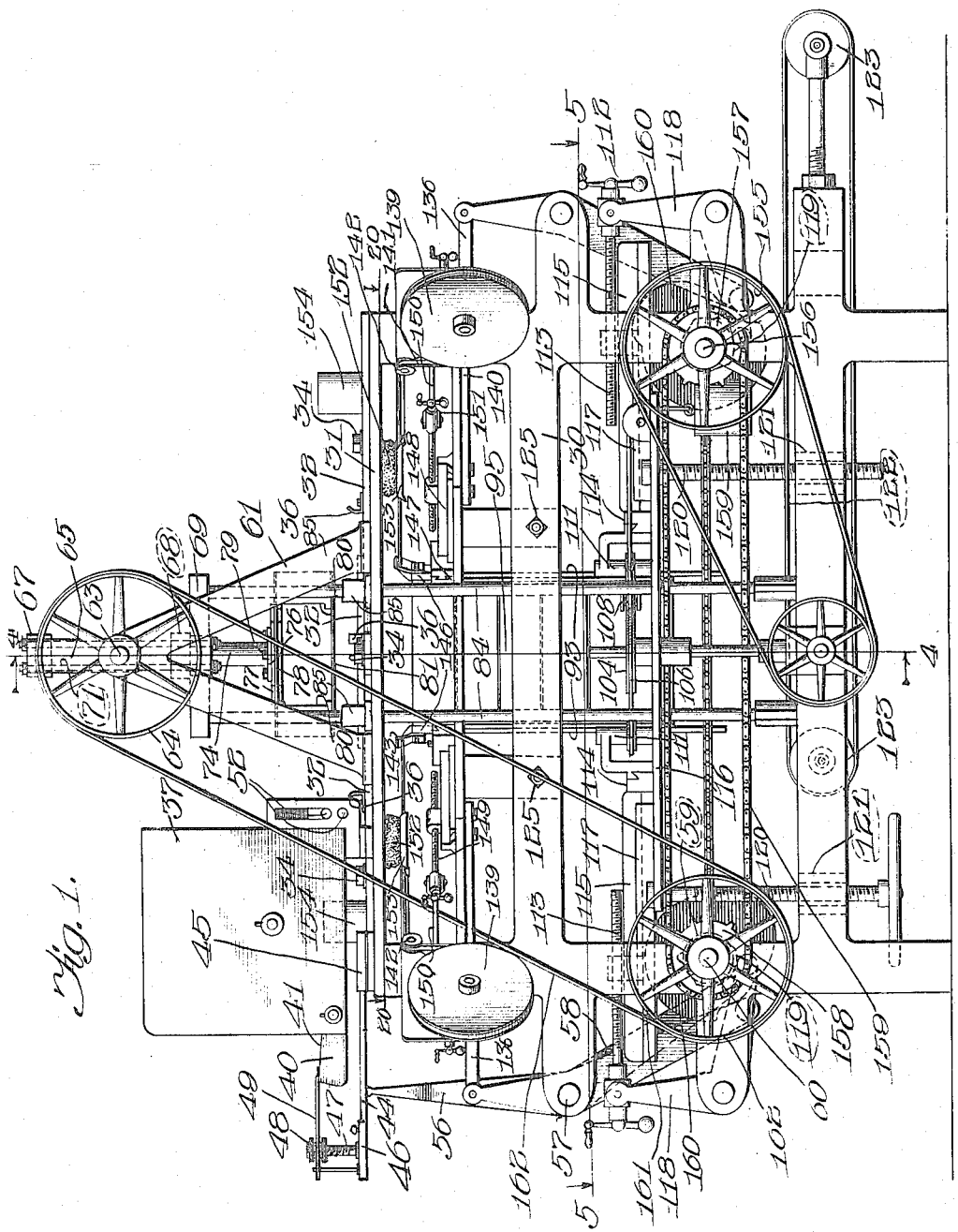
Figure 6:
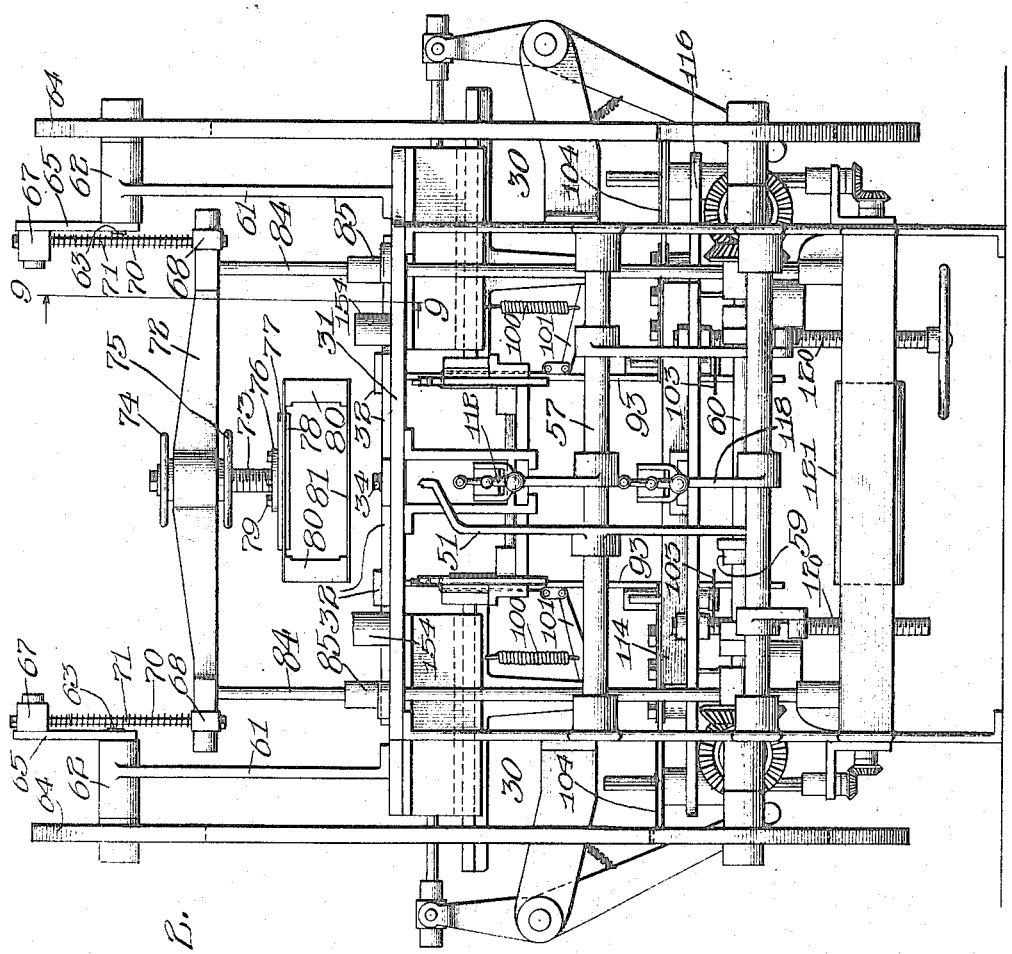
Figure 4:
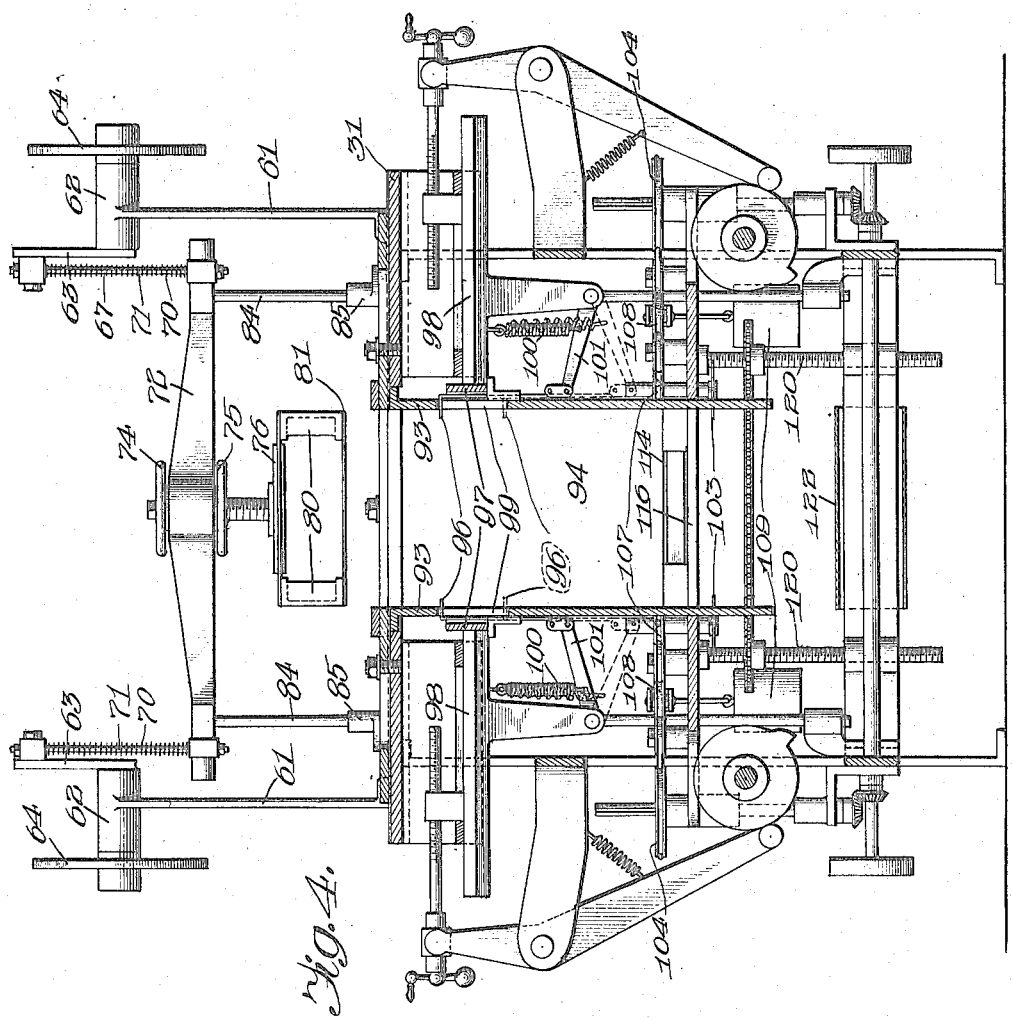

Figure 1 represents a side elevation of my machine. Fig. 2 represents an end elevation, with the feed-box removed. Fig. 3 represents a top plan view with the standard and plunger removed. Fig. 4 represents a vertical sectional view on the line 4—4 of Fig. 1, looking in the direction indicated by the arrows. Fig. 5 represents a horizontal sectional view on line 5—5 of Fig. 1. Fig. 6 represents a side elevation of one of the saws. Fig. 7 is a top plan view of Fig. 6. Fig. 8 represents a sectional view on line 8—8 of Fig. 7, looking in the direction indicated by arrows. Fig. 9 represents a sectional view on line 9—9 of Fig. 2, looking in the direction indicated by arrows. Fig. 10 represents a top plan view of the plunger. Fig. 11 represents a side elevation of the plunger. Fig. 12 represents a plan view of the plunger contracted. Fig. 13 represents a perspective view of one of the corner pieces. Fig. 14 represents a top plan view of the feed-box. Fig. 15 represents a side elevation of Fig. 14 partly broken away. Fig. 16 represents an enlarged detail of the end of the plunger or finger. Fig. 17 represents a front elevation of Fig. 14. Fig. 18 represents a sectional view on line 18—18 of Fig. 14, looking in the direction indicated by the arrows. Fig. 19 represents a front view of a portion of Fig. 18. Fig. 20 represents a sectional view on the line 20—20 of Fig. 1, looking in the direction indicated by the arrows embodying slight modifications. Fig. 21 represents a sectional view on the line 21—21 of Fig. 20, looking in the direction indicated by the arrows. Fig. 22 represents a plan view of a portion of Fig. 21. Fig. 23 represents a section view on line 23—23 of Fig. 22, looking in the direction indicated by arrows. Fig. 24 represents an enlarged detail of a separator. Fig. 25 represents a sectional view on line 25—25 of Fig. 24, looking in the direction indicated by the arrows. Fig. 26 represents a perspective view of a box-blank. Fig. 27 represents a perspective view of a finished box.

Like numerals of reference indicate like parts in the several figures of the drawings.

Referring now to the drawings—30 represents a frame and 31 the upper table of the machine, on which are mounted a plurality of guides 32. These guides are slotted as shown at 33, and set-screws 34 pass through the slots 33 and into the table 31, thus permitting an endwise adjustment of the guides 32 to accommodate the manufacture of different sizes of boxes. The surface of the table underneath the guides 32 is marked off with scales 35 by means of which the position of the guides is regulated. Adjustably mounted on each of the guides 32 is a stop 36 which serves to hold the box-blanks in position, as they are fed from the feed-box or carrier 37 mounted on a support 38 seated on the table, and also provided with a slot 39 by means of which the position of the carrier may be regulated.

Two wedge-shaped members 40 in the bottom of the feed-box form a sloping surface 41 on which the box-blanks rest. Inside the feed-box are adjustable side plates 42, movable cross-wise of the box, thus making the width of the box accommodate blanks of different sizes and still hold them in place to insure accurate feed.

A sliding bar 44 moves horizontally above the table within a guide 45 fixed to the table. Near the outer end of this bar is mounted a sliding member 46 carrying an upright 47. A pair of thumb-screws or any other similar device 48 is arranged on this upright, adapted for vertical adjustment and carrying a finger or plunger 49. This plunger is adapted to force the blanks 50—50 from the feed-box one at a time.

At the bottom of the front of the feed-box 37 is a horizontal slot or opening 51 of a size sufficient to permit but one blank at a time to pass through. A pair of continuously running spring-controlled rollers 52 are arranged directly opposite the opening 51 and are adapted to receive the blank between the rollers as it is forced from the feed-box.

Referring now to the plunger 49, it will be noted, from Fig. 16, that this terminates at its lower end in an extended portion or offset 53 adapted to lie at all times within the feed-box underneath the blank. The lip or shoulder 54 is formed of a thickness to force only a single sheet of board from the box when the plunger is moved forward, the top 55 of the offset passing under the next blank. It will be noted that this lip 54 is so positioned as to permit the forcing of each blank far enough from the box to pass between the rollers 52 and 51 and be engaged thereby, thus providing for the withdrawing of each blank from the feed-box.

The sliding bar 44 is operated through the medium of a bell-crank lever 56 mounted on a shaft 57 and connected at its upper end to the bar 44. The position of the lower end 58 of the lever is varied by a cam 59 mounted on the shaft 60.

On the frame 30 is mounted a double standard 61 provided with bearings 62 in which are journaled crank-shafts 63. On the end of each crank shaft is keyed a drive wheel 64. On the opposite ends of the shafts 63 are mounted crank arms 65 on the wrist-pin 66, on each of which is mounted a flexible pitman. It is apparent that the wrist-pins 66 on the oppositely disposed lugs of the standard 61 can be extended, forming a shaft through which power can be communicated from a single wheel, but I prefer to use two drives 64 as outlined above. On the top of each pitman is a bearing 67 and at the bottom a bearing 68 to which is secured a cross-bar 69. Stiffening springs 70 surround the pitman bars 71 between the bearings 67, 68, permitting a movement of the bearings toward each other and making the plunger carried thereby flexible.

A cross-bar 72 connects the lower pitman bearings, on opposite sides of the center of which is mounted an adjustable plunger holder 73 comprising in this form a threaded shaft with hand-wheels 74, 75, on the top and bottom of the cross-bar. This shaft is prevented from turning in its bearings by a spline or any similar means. On the base 76 of the plunger shaft is mounted a plate 77 to which is secured a removable plate 78, forming the top of the former proper. The reinforcing plate 77 is preferably provided to stiffen the top and to retain the threads of the screw-bolts 79, holding the plates in place. Corner pieces 80 (best shown in Fig. 13), are secured at their bases to the bottom plate 81. These corner pieces are secured to the plates 81 and 78 by means of screws 83. It will thus be seen that by the use of different sizes of plates the size of the former may be regulated to accommodate the machine to the manufacture of any size or shape of box desired.

The cross-bar 72 above described is mounted to run on suitable posts or guides 84 passing through the frame of the machine. On top of the table 31 are mounted stops 85 through which the posts or guides 84 pass, and by means of which the downward motion of the plunger is arrested.

When the drive 64 is operated and the pitmen force the plunger downwardly, as shown in Fig. 9, the cross-bar 69 strikes the stops 85. A further revolution of the drive compresses the spring 70 (as shown in dotted lines in Fig. 9). It will be seen that this spring is compressed during about one-third of the revolution during which time the plunger remains stationary. This dwell of the plunger is arranged to cover a period sufficient to permit the other mechanisms to perform their respective functions. Of course, it is understood that this dwell may be regulated by varying the stroke of the crank in the event that it is desired to change the period of operation of any of the other mechanisms of the machine.

Against the inner front surface of the feed-box 38 are fitted adjustment strips 86. Slots 87 in the front 88 of the box serve as guides. Through these slots adjustable screw-bolts 87ª extend into the guides 86. By moving the guides up or down, the width of the opening 51 in the lower portion of the feed-box is regulated. On the outside of the face 88 is also provided an adjustable rubber or frictional stop 89 provided with a spring stem 90. This stop is mounted on bearings 91 secured to the front of the box, and by the use of the thumb-screw 92 the position of the stop may be adjusted. Ordinarily it is only necessary to use the inner adjustment strips 86, but in the event of very thin cardboard being used, it is sometimes advisable to use the frictional stop in order to prevent more than a single blank from passing through the opening at the same time.

When a blank has been forced out of the feed-box and onto the table and held in place between the stops 36 and the plunger brought down, the center of the blank is forced down between guides 93, which are secured to the adjustable strips 39 on the sides of the well 94, and the sides are forced up forming a box 95, as shown in Fig. 1.

Located below the top of the table are four separators or fingers 96 running in guides 97. These fingers may comprise a single finger, or may be divided, forming a yoke as shown in Fig. 24. The guides 97 are mounted on tool-holders 98, and are adjusted for horizontal and vertical movement. The horizontal movement permits the withdrawal of the separator fingers from the well, and the vertical movement permits the separator to slide within the slots 99 in the guides 93 to accommodate boxes of various depths. When the former forces the box-blank downwardly, the bottom of the formed box first strikes the separator fingers 96 and forces them downwardly through a distance equal to the depth of the boxes, the fingers occupying the position shown in dotted lines in Fig. 4. This places the spring 100 under tension, the arm 101 being forced downwardly. The plunger now dwells, and the pasting operation, to be described later, is completed.

The pasting means operates the separating means, so when the pasting is completed and the means withdrawn, the separator fingers are also withdrawn from the well and slot 99. As soon as this occurs, the tension of the spring 100 forces the fingers upwardly, where they resume their original horizontal position, and the tool-holders 98 move forwardly through a sufficient distance to bring the fingers slightly within the well, and to a position within the slots 102 on the edge of the plunger. This brings the lower face of the end of the fingers against the top of the completed box, so when the plunger is moved up, the fingers act as strippers to insure the removal of the box from the former; or, in other words, forces the box to remain in its lower position while the former moves upwardly. It will thus be noted that these fingers perform a double function—that of acting as separators between adjacent boxes, and also as strippers to insure the box remaining in proper position for further operation. The separator fingers then resume their first position, and are in position to act as separators for the next box. We now assume the strips holding the corners of the boxes together to be in place and the box completed. The next blank above is now forced down in the same manner, forcing the first box downwardly through an equal distance. The four corners of the two boxes are held together by the strips above referred to, but are separated by a space just equal to the thickness of the separator fingers. These operations being continued for a predetermined number of times, finally bring the lower two boxes united by the corner strips in position to be cut apart by the saws.

Referring now to Fig. 5, a series of four circular saws 103 are revolved continuously by means of drives 104, the belts 106 passing around said drives and series of idlers 107 arranged to guide the belts into proper position, one pair of idlers 108 being used to automatically tighten the belts through the medium of weights 109. The saws 103 are mounted on arbors 110 running in frames 111, and are arranged for horizontal adjustment in one direction, the adjustment at right angles thereto being taken care of by means of handles 112 operating guides 113 which move the horizontal cross-bars 114, to which the saw frames are secured. The slidable bearings 115 are mounted on the saw platen and held in place by gibs 117. The saws are brought into and out of cutting engagement with the strips between the boxes, through the medium of a bell-crank lever 118 engaging the face of a suitable cam 119. The saw platen 116 is mounted for vertical adjustment on four screws 120 working in unison in bearings 121 on the main frame. When the saws have severed the four corner strips holding the last two boxes together, the severed box drops on a plate or conveyer 122 which is independently driven on pulleys 123.

Referring now to the method of fastening the sides of the box together (see Figs. 20 to 25 inclusive), the tool-holder plate 124 is rigidly mounted on the frame in any desired manner, as, for instance, by means of bolts 125. As shown in Fig. 20, the separators consist of a single pair 126, 127, instead of four, as shown in Fig. 3, and terminate in double fingers 128 mounted above the plate 124. The use of the double fingers where only two separators are used serves to give a better bearing for the box and prevent its slipping out of position. These fingers are mounted on adjustable slide bars 129 provided with studs 131 adapted to engage a pair of bell-crank levers 132, 133, through the slots 134. The ends of the slides terminate in a fork 135 in which is mounted a link connection 136 which in turn is connected to a suitable cam for imparting the desired motion thereto. The levers are pivotally seated on the plate 124 at 137 and 138. The four tape-rolls 139 are seated on suitable brackets 140 secured to the corners of the frame, and the tape or staying material 141 conducted over any suitable guide-rolls as 142. A series of guide-bars 143 are secured to the corners of the pressing tool adjacent to the corners of the well. The tape which may consist of cloth, paper or any suitable material passes through slots 144 in the guide bars, and is turned downwardly, as shown at 145, in position to be engaged by the pressing tool. This pressing tool is best shown in Figs. 21 and 22, and comprises a slotted V-block 146 mounted on the block 147 arranged for slight horizontal adjustment by being slidably mounted on the end of the presser-bar 148. On this presser-bar 148 is mounted a screw 149 by means of which the position of the presser-bar may be varied. One end 150 of the bell-crank lever 132 is pivotally mounted on the screw at 151. The slide 129 and the bar 148 are, therefore, connected to act in unison in opposite directions.

In the present construction, when the slide 129 is withdrawn carrying the fingers 128, the presser-bar is forced forwardly pressing the moistened tape, formed into the shape of a right angle, tightly against the sides of the box at the corners. Between the tape-roll 139 and the guide 143 is located any desired form of moistening means, shown in the present instance as a sponge 152 resting in a tray 153 through which the tape 143 is carried. This sponge may be kept moist in any desired manner, as by drip pans 154.

The power for operating the machine is obtained in any desired manner, as from a main drive 155 on the main shaft 156 by means of any suitable set of gearing, shafts and cams, and the power is transmitted to the various parts of the machine heretofore described, for the purpose of carrying out the described operation of the machines.

Referring now to the operation of my machine, the box former secured to the bottom of the plunger is adjusted to the exact size required, and by the adjustment of the guides on the table the well is caused to conform to the size and shape of the former, and sufficiently larger to permit the former to press the material, from which the box is formed, between itself and the sides of the well. The stroke of the plunger is regulated so that the former will pass within the well and downwardly a distance equal to the inside depth of the box. The separators are also adjusted so that when the fingers are forced outwardly within the well and the box forced down by the plunger, the bottom of the box will just rest on top of the separator fingers. The opening 51 in the feed-box is also adjusted to suit the thickness of the cardboard or other material from which the box is formed, so that only one blank is forced through the opening at a time. As explained heretofore, the frictional stop 89 in front is only used in the event that the cardboard or material from which the box is formed is quite thin, and there is danger of more than one blank being forced through the opening, in which event the upper blank is frictionally engaged by the rubber stop and held from passing out of the opening 51. The blank then falls on the table under the former, and is held in proper position by means of the stops 36. The operation of the machine then forces the plunger downwardly as above described, and the box is formed into shape. The strips of tape are brought from the roll through the guard and in a vertical position adjacent the outer corners of the box. The fingers of the separator which have been forced downwardly until they have reached the proper position, depending on the depth of the box, are then withdrawn, and at the same time the presser-bars force the tape against adjacent sides of the corners of the box, holding it there securely in place while the fingers, released from their position beneath the box, fly upwardly and inwardly sufficient to serve the purpose of the strippers as explained heretofore. During this period the plunger dwells for a sufficient interval to permit the operation to be completed. It is then withdrawn, the fingers slightly extending within the well serving to prevent the boxes from following the former. The separator fingers then resume their normal position projecting within the well in position to be engaged by the next box and forced downwardly to their lowest position. The presser-bar is then withdrawn and the next succeeding blank forced downwardly, which in turn forces the box below it to a distance equal to the depth of the box. After this operation has been repeated several times, the well of the machine will be filled with a string of boxes secured at their four corners by continuous strips of tape. At a predetermined time, depending on the size of the boxes, the lowermost box will reach a point in the bottom of the well at which the space between the lowest and the next box above is exactly opposite the four saws located at each corner of the well. These saws which are preferably continuously operated, and have been adjusted vertically to the desired position, are then swung in, as heretofore described, simultaneously severing the tape at the four corners. The severed box then drops upon the carrier, which is moving continuously, and the box is then carried away from the machine and taken off or deposited in a bin adjacent thereto.

Let us now consider the operation of the machine as a whole. The feed-box is supplied with the blanks and the tape-rolls with tape, the ends of which have been passed through the slotted guides 143 and into the well, in position to be acted upon by the presser-bar, and the feed-rollers, the cutting saws and the conveyer running continuously by power from any desired source. The revolution of the main shaft 156 operated from the drive 155 is transmitted through a series of sprocket wheels 157—158 and chains 159 to the cam-shaft 60 having the same number of revolutions per minute as the main shaft. Power from this shaft is transmitted from the drive pulley 161 through the medium of a chain 162 to the drive pulley 64. This forces the plunger down until the cross-head 69 strikes the stops 85. While this is taking place, the cam 59 on the shaft 60 operates the bell-crank lever 56, carrying the plunger 49 forcing a box-blank into engagement with the feed-rolls 52, which feed it into position below the former before the plunger reaches the level of the table. The lever 136 acting through the cam 160 operates the pressing tool and separator fingers, and the separator fingers are brought into operative position within the well. The former having now passed into the well carries the blank with it until it strikes the top of the separator fingers, and forces them down to their lowest limit of travel, at which time the plunger and former dwells. The continued revolution of the shaft, operating through the cam 160 and levers 116, withdraws the separator fingers out of engagement with the slot and forces the presser-bars against the corners of the box carrying with it the adhesive tape which is snugly pressed into place. The cam now carries the separator fingers slightly within the well, into position to act as strippers. After the dwell of the plunger is ended, it is raised, the former coming out of the well, and the separator fingers acting as strippers, hold the box in place within the well. The separator fingers are then forced farther within the well in position to act as separators. The second box-blank is then forced downwardly in the same manner, but the separator fingers having now resumed their normal position, are above the sides of the first box, and as the second blank forces the fingers downwardly, the first box is forced before it, separated by the separator fingers. The tape being pasted or secured to the corners, pulls or feeds more tape from the tape-roll into position to be secured to the second box. While the plunger is moving up, the cam 119 on the shaft 156 carries the saw support forward until the saws, which are revolving continuously, project within the corners of the well. When the string of boxes secured together at the corners by the tapes reaches the saws, the space between the two lower boxes equal to the depth of the separator fingers registers with the saws just at the time that the saws are carried within the corners of the well. The severed box drops on the conveyer and is carried away, as before explained. Each subsequent revolution of the shaft forces the blank within the well, and severs a box from the bottom of the string.

It will be noted that after the presser has performed its operation, and the tape secured to the corner of the box, a considerable interval of time elapses before the boxes are cut apart. This length of time during which the boxes are in the well of the machine allows a sufficient time for the tape to dry and thus firmly hold the corners of the box together. This being the case, when the cutting mechanism is operated, the tape is not liable to slip from its position on the box. It is an essential feature of my device that the severing of the boxes takes place after the adhesive material has been applied, instead of before, this method resulting in the box corners being held securely fastened together, and at the same time preventing any liability of the adhesive material or tape slipping out of place, which would be very apt to happen if the tape were severed before being fixed to the corners of the box.

When the first box enters the well and rests upon the top of the separator fingers, the plunger forces it downwardly until a proper position is reached. The following box forces the first-named box, and the operation is continued, thus doing away with any direct feeding mechanism for the tape or adhesive material, the boxes themselves, through the medium of the operations upon them, forming the feeding mechanism. Or, in other words, the advancing box or blank does the feeding for its successor.

While I have shown the tape-rolls extending at an angle from the machine in order that the tape itself may strike the corners in proper position to be operated upon by the presser-bar, it is quite evident that it would be an easy matter, if it were desired, for the sake of compactness or any other reason, to place the feed rolls within the machine, and guide the tape or adhesive material in such a manner as to be delivered to the presser-bar in the desired manner.

The plunger is made adjustable, so that it always brings the top head or surface of the box in the same plane in various depths of boxes or blanks. This permits the cutting-off mechanism to be stationary so far as vertical adjustment is concerned.

I claim:

1. In a paper box making machine, the combination of a well of sufficient length to receive and hold a plurality of boxes, a reciprocating former adapted to work in the upper end of the well to fold the box blank into finished shape, means for supplying an adhesive tape to each corner of the well and applying it to the adjacent corner of the box after the box is formed in the well, means for pressing the tape thus drawn in against the corners of the box while the reciprocating former is withdrawn from the well, whereby by said folding operation the boxes will be pushed down into the well in succession and each preceding bar will pull into the well a sufficient length of tape to extend the full length of the corners of the next succeeding box, whereby upon discharge from the lower end of the well the boxes will all be flexibly connected together at their corners by said tapes.

2. In a paper box making machine, the combination of a well of sufficient length to receive and hold a plurality of boxes, a reciprocating former adapted to work in the upper end of the well to fold the box blank into finished shape, means for supplying an adhesive tape to each corner of the well and applying it to the adjacent corner of the box, whereby each preceding box will draw sufficient tape into the well to extend the full length of the corners of each succeeding box, whereby the boxes will be pushed down into the well in succession and each preceding box will pull into the well a sufficient length of tape to extend the full length of the corners of the next succeeding box, whereby upon discharge from the lower end of the well the boxes will all be flexibly connected together at their corners by said tapes, means being provided for spacing each succeeding box away from its predecessor so that the tapes may be severed at points between the boxes without injuring the boxes or the corner fastenings.

3. In a box machine, a well of sufficient length to receive and hold a plurality of shaped boxes, a reciprocating former adapted to enter the upper end of the well to thus fold the blanks into box form, means for engaging the upper edge of each box to hold it in the well upon withdrawal of the reciprocating former, whereby successive operations of the former will charge the well with a series of superposed boxes, means for leading an adhesive tape into each corner of the well at a point where it will contact with the adjacent corner of the box, and means for pressing the tapes against the corners of the box during the outward movement of the plunger, whereby each preceding box when it is pushed down by a succeeding box will draw into the well a sufficient length of tape to extend the full length of the corners of the succeeding box, whereby when the completed boxes are discharged from the well they will be connected together by the tapes.

4. In a paper box making machine, a well, a reciprocating former adapted to enter the upper end of the same to fold and shape the blank into box form, means for leading an adhesive tape into each corner of the well, these tapes entering the well at a point below the upper end thereof so that each box will be shaped before it comes in contact with the tape, and means for pressing the tapes against the corners of the box while the former is being withdrawn from the well, whereby as each box is forced down into the well it will draw into the well a sufficient length of tape to extend the full length of the corners of the succeeding box, substantially as set forth.

5. In a paper box making machine of the class described, a well, a reciprocating former adapted to fold a blank as it enters the upper end of the well, said well having sufficient length to accommodate a plurality of superposed boxes, means for leading a tape into the well coincident with each vertical joint in the box, the tapes entering the well at a point below the upper end thereof so as to come into contact with the joints of the box after the same is shaped by the folding means, means for pressing the tapes against the joints in the box during the outward reciprocation of the former, whereby as each preceding box is forced down into the well it will draw into the well a sufficient length of tape to extend the full length of the joints of the succeeding box, substantially as set forth.

6. A box making machine comprising a frame, a table provided with an opening, means for adjusting the size and shape of said opening, a former adapted to pass within said opening, blank feeding mechanism for bringing blanks into position to be operated upon by said former, means for supplying adhesive material on said blanks when formed whereby a string of completed boxes is formed, means for severing said completed boxes one at a time, and means whereby the adjustment of said opening carries with it the adjustment of said adhesive and severing means.

7. A box making machine comprising a frame, a table provided with an opening, means for adjusting the size and shape of said opening, a former adapted to pass within said opening, blank feeding mechanism for bringing the blanks into position to be operated upon by said former, means for supplying adhesive material on said blanks when formed whereby a string of completed boxes is formed, means for severing said completed boxes one at a time, and means whereby the simultaneous adjustment of said opening carries with it the adjustment of said adhesive and severing means.

8. In a box-making machine, a frame, a table having a central opening therein, a series of adjustable guides seated on said table whereby the size and shape of said opening may be adjusted, and a plunger capable of vertical adjustment carrying former adapted to pass within the well, together with means seated within the well for limiting the vertical movement of said former.

9. In a box-making machine, a frame, a table having a central opening therein, a series of adjustable guides seated on said table whereby the size and shape of said opening may be adjusted, and a plunger capable of vertical adjustment carrying former adapted to pass within the well, together with means seated within the well for limiting the vertical movement of said former, the said means comprising a plurality of separator fingers adapted to be alternately forced horizontally into and out of said well.

10. In a box-making machine, a frame, a table having a central opening therein, a series of adjustable guides seated on said table whereby the size and shape of said opening may be adjusted, and a plunger capable of vertical adjustment carrying former adapted to pass within the well, together with means seated within the well for limiting the vertical movement of said former, the said means comprising a plurality of spring-actuated separator fingers adapted to be alternately forced horizontally into and out of said well.

11. In a box-making machine, a frame, means for successively forming a single box so that there is within the machine a string of completed boxes united to each other at their corners by strips of tape, and a series of saws by which the lowermost of said string is severed therefrom.

12. In a box-making machine, a frame, means for successively forming a single box so that there is within the machine a string of completed boxes united to each other at their corners by strips of tape, and a series of saws by which the lowermost of said string is severed therefrom, together with means for bringing said saws into and out of operative engagement.

13. In a box-making machine, a frame, means for forming within the machine a string of completed boxes united to each other at their corners by strips of staying material or tape, and adjustable means by which the lowermost of said string is severed therefrom.

14. In a box-making machine, a frame, adjustable means for forming a single box so that there is within the machine a string of completed boxes united to each other at their corners by strips of tape, and adjustable means by which the lowermost of said string is severed therefrom.

15. In a box-making machine, a frame, adjustable means for forming a single box so that there is within the machine a string of completed boxes united to each other at their corners by strips of tape, and a series of saws by which the lowermost of said string is severed therefrom.

16. In a box-making machine, a frame, adjustable means for forming a single box so that there is within the machine a string of completed boxes united to each other at their corners by strips of tape, and a series of adjustable saws by which the lowermost of said string is severed therefrom.

17. In a box forming machine, a frame, means for successively forming a single box of a connected series, means for attaching stay tape to the corners of said boxes, each of said boxes in its downward course presenting the stay tape for the succeeding box, a series of saws whereby the lowermost of said series of completed boxes are successively cut from the series.

Signed by me at New York, New York, this 31st day of July, 1908.

JAMES PHILIP BIRD.

Witnesses:
  GEO. S. BONDINTZ,
  FRED WHITE.